(12) United States Patent
Chen et al.

(10) Patent No.: US 10,858,500 B2
(45) Date of Patent: Dec. 8, 2020

(54) CARBON NANOTUBE / GRAPHENE COMPOSITES

(71) Applicant: FGV CAMBRIDGE NANOSYSTEMS LIMITED, Cambridge (GB)

(72) Inventors: Jinhu Chen, Cambridge (GB); Krzysztof Kazimierz Koziol, Cambridge (GB); Catharina Paukner, Cambridge (GB)

(73) Assignee: FGV Cambridge Nanosystems Limited, Cambridge (GB)

( * ) Notice: Subject to any disclaimer, the term of this patent is extended or adjusted under 35 U.S.C. 154(b) by 0 days.

(21) Appl. No.: 15/781,162

(22) PCT Filed: Nov. 30, 2016

(86) PCT No.: PCT/GB2016/053766
§ 371 (c)(1),
(2) Date: Jun. 4, 2018

(87) PCT Pub. No.: WO2017/093730
PCT Pub. Date: Jun. 8, 2017

(65) Prior Publication Data
US 2018/0346689 A1 Dec. 6, 2018

(30) Foreign Application Priority Data
Dec. 3, 2015 (GB) .................................. 1521392.9

(51) Int. Cl.
*H01B 1/04* (2006.01)
*H01B 1/24* (2006.01)
(Continued)

(52) U.S. Cl.
CPC ...... *C08K 7/24* (2013.01); *C08J 5/10* (2013.01); *C08K 3/04* (2013.01); *C08K 3/041* (2017.05);
(Continued)

(58) Field of Classification Search
CPC ...... H01B 1/02; H01B 1/04; C08K 3/04; C08K 3/041; B82Y 30/00
(Continued)

(56) References Cited

U.S. PATENT DOCUMENTS

| 2011/0210282 A1* | 9/2011 | Foley | B82Y 25/00 252/62.51 R |
|---|---|---|---|
| 2014/0011969 A1* | 1/2014 | Panchapakesan | C08K 3/04 525/476 |

(Continued)

FOREIGN PATENT DOCUMENTS

| CN | 103254572 | 8/2013 |
| WO | 2014070500 | 5/2014 |
| WO | 2014144144 | 9/2014 |

OTHER PUBLICATIONS

Hwang "Electromechanical strain sensing using polycarbonate-impregnated carbon nanotube-graphene nanoplatelet hybrid composite sheets" Composites Science and Technology 89, 1-9 (Year: 2013).*

(Continued)

*Primary Examiner* — Tri V Nguyen
(74) *Attorney, Agent, or Firm* — Bookoff McAndrews, PLLC

(57) ABSTRACT

An electrically conductive composite material includes carbon nanotubes and graphene nanoplatelets within a polymer matrix. The carbon nanotubes have an average length greater than 10 μm. The graphene nanoplatelets form in the range of 0.005 wt. % to 0.06 wt. % of the composite material. Also provided is a mixture having such a composition, an article comprising such a composite material, and a composite production method.

18 Claims, 14 Drawing Sheets

(51) Int. Cl.
 B82Y 30/00 (2011.01)
 C08K 7/24 (2006.01)
 C08J 5/10 (2006.01)
 C08K 3/04 (2006.01)
(52) U.S. Cl.
 CPC ............ *C08K 3/042* (2017.05); *H01B 1/04* (2013.01); *H01B 1/24* (2013.01); *B82Y 30/00* (2013.01); *C08K 2201/001* (2013.01); *C08K 2201/003* (2013.01); *C08K 2201/004* (2013.01); *C08K 2201/011* (2013.01)
(58) Field of Classification Search
 USPC .................... 252/500, 510, 511; 977/742
 See application file for complete search history.

(56) References Cited

U.S. PATENT DOCUMENTS

2015/0275016 A1   10/2015  Bao et al.
2017/0148970 A1*  5/2017   Yu ........................ H01B 1/24
2017/0154703 A1*  6/2017   Lonjon ................. B29B 11/16

OTHER PUBLICATIONS

Yang "Synergetic effects of graphene platelets and carbon nanotubes on the mechanical and thermal properties of epoxy" Carbon 49, 793-803 (Year: 2011).*

Yue Liang et al., Epoxy Composites with Carbon Nanotubes and Graphene Nanoplatelets-Dispersion and Synergy Effects, Carbon, vol. 78, pp. 268-278, Jul. 9, 2014.
Maiti, S. et al., "Polystyrene/MWCNT/Graphite Nanoplate Nanocomposites:Efficient Electromagnetic Interference Shielding Material Through Graphite Nanoplate-MWCNT-Graphite Nanoplate Networking", ACS Applied Materials and Interfaces, vol. 5, No. 11, pp. 4712-4724, May 2, 2013.
Martin, C.A. et al., "Formation of Percolating Networks in Multi-Wall Carbon-Nanotube-Epoxy Composites", Composites Science and Technology, vol. 64, No. 15, pp. 2309-2316, Apr. 21, 2004.
United Kingdom Search Report in corresponding UK appl. No. GB1521392.9, dated Jun. 8, 2016.
International Search Report in corresponding international appl. No. PCT/GB2016/053766, dated Feb. 7, 2017.
Written Opinion in corresponding international appl. No. PCT/GB2016/053766, dated Feb. 20, 2017.
Singh, C. et al., "Production of Controlled Architectures of Aligned Carbon Nanotubes by an Injection Chemical Vapour Deposition Method", Carbon, vol. 41, pp. 359-368, 2003.
Gagne, M. et al., "Lightning Strike Protection of Composites", Progress in Aerospace Sciences, vol. 64, pp. 1-16, 2014.
Russ, M. et al. "Length-Dependent Electrical and Thermal Properties of Carbon Nanotube-Loaded Epoxy Nanocomposites", Composites Science and Technology, vol. 81, pp. 42-47, Jun. 14, 2013.

* cited by examiner 1.2 mm

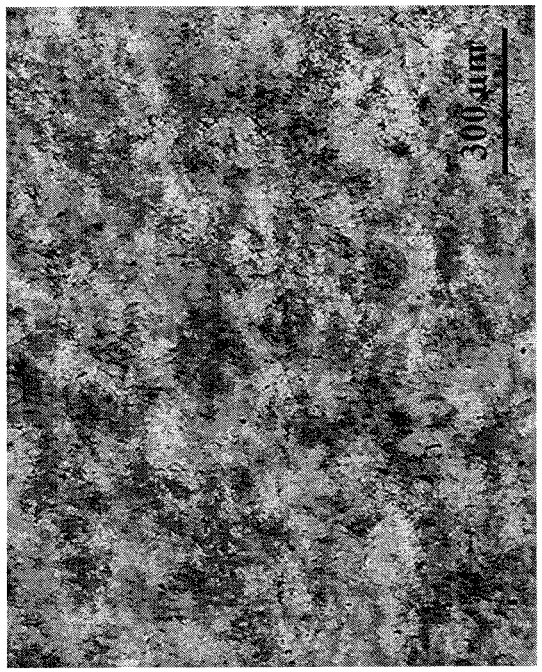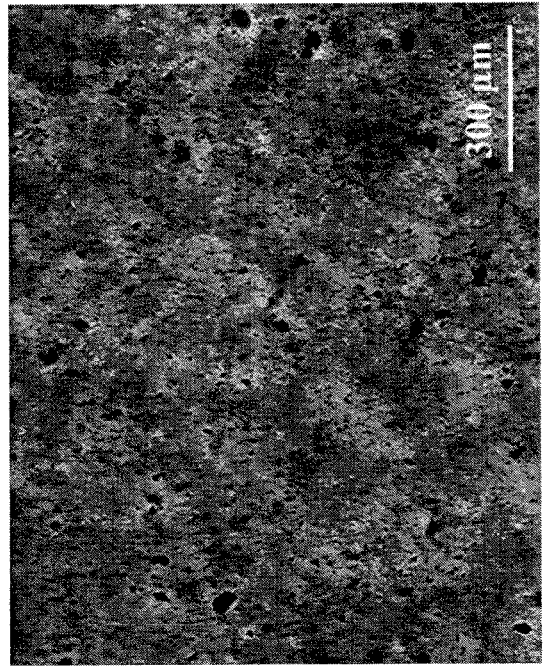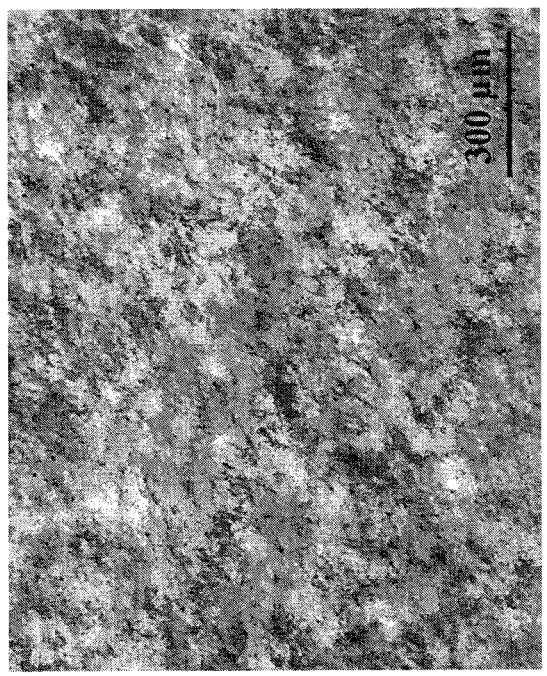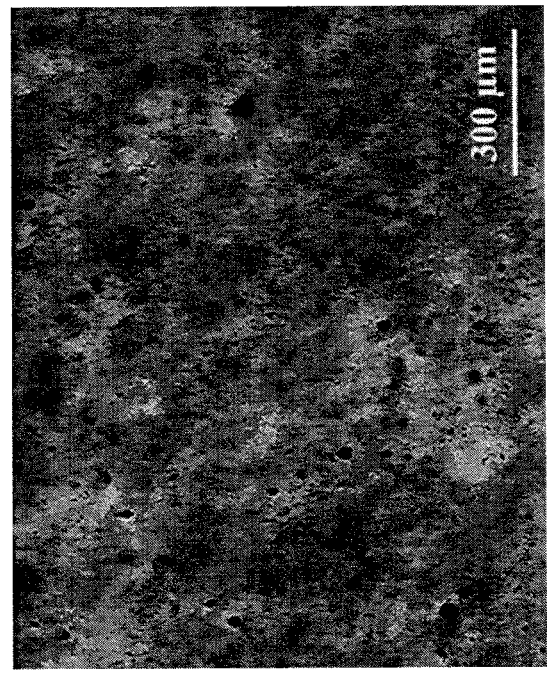
Figure 5

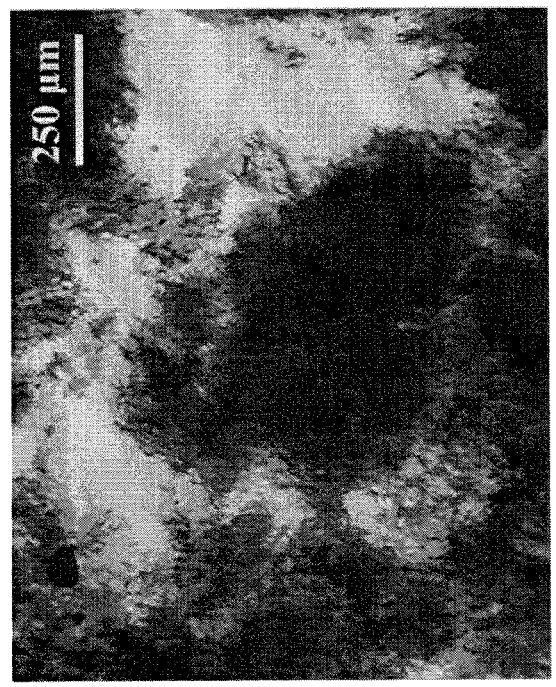
Figure 7

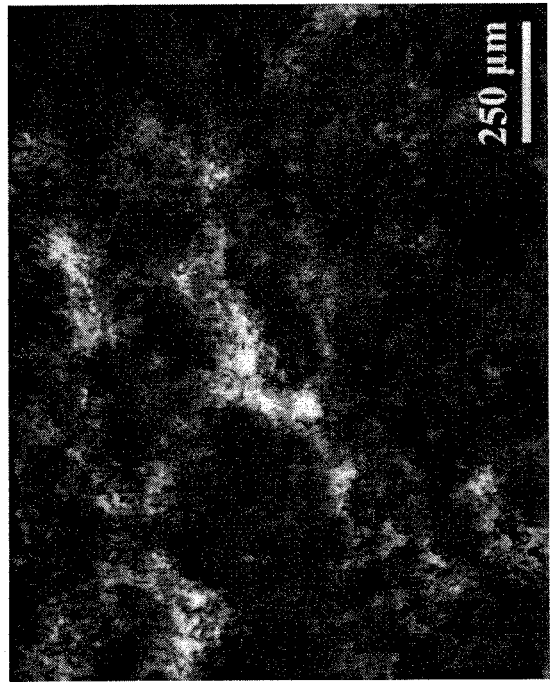
(a)
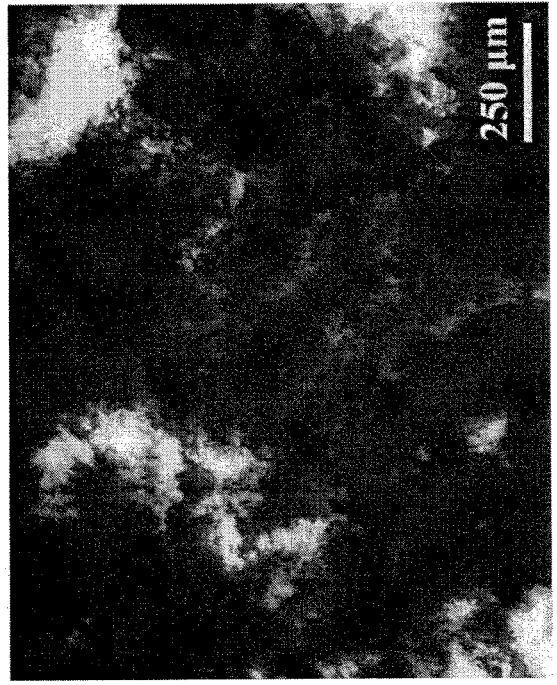
(b)
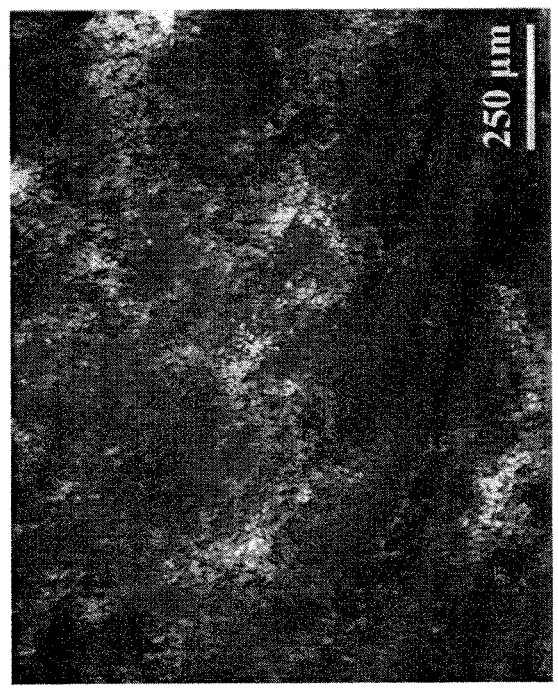
(c)
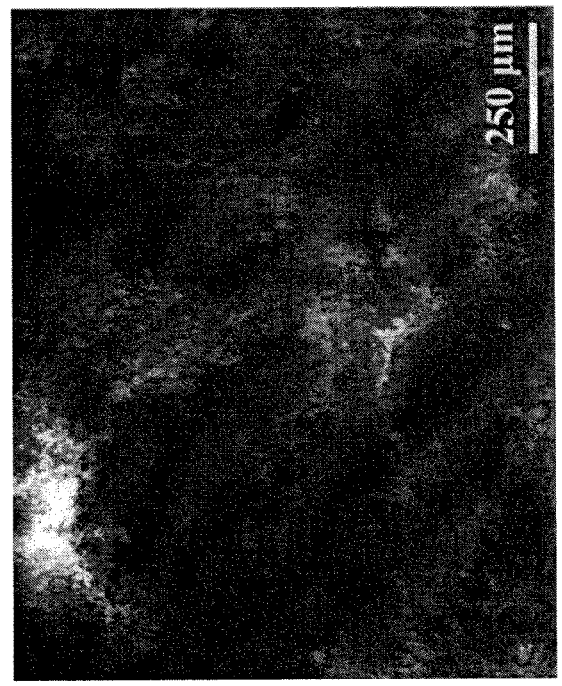
(d)
Figure 8

CARBON NANOTUBE / GRAPHENE COMPOSITES

FIELD OF THE INVENTION

This invention relates to composite materials comprising carbon nanotubes and graphene nanoplatelets within a polymer matrix.

BACKGROUND TO THE INVENTION

Polymer composites, consisting of homogeneously dispersed electrically conducting fillers in an insulating polymer matrix, have been sought for use in various electrical applications. However, this class of composite material is still prone to lightning strike damage, electromagnetic interference and poor electrostatic discharge dissipation unless metals or metallic materials are incorporated (e.g., the bonding of metal mesh within the composite structure for lighting strike protection) [1]. To date, apart from metallic materials, conventional electrically conducting fillers also include carbon nanotubes (CNTs), carbon black (CB) and graphene nanoplatelets (GNPs).

The use of carbon-based nanofillers with high aspect ratio to reduce the loading fraction required for percolation has been regarded as an effective route to potentially achieve electrically conductive polymer composites with light weight and low cost [2]. In particular, CNTs have attracted considerable research attention due to their unique chemical and electronic structure delivering remarkable mechanical, thermal and electrical properties. CNTs that are homogeneously distributed within liquid polymer or epoxy resin systems are energetically more favourable in the form of agglomerates than in the dispersed state, due to the potential energy. As a result, shear-intensive mechanical mixing processes have been widely used to effectively disperse CNTs as well as other fillers of different geometric shapes.

However, the incorporation of CNTs into the uncured polymer matrix, when CNTs are used in the form of isotropic powders with high aspect ratios, significantly increases the viscosity even at low weight fractions, and results in processing challenges involving shear mixing and degassing prior to the final curing stage which limits the electrical performance of the cured polymer composites. Hence, in order to facilitate the processing of such composites whilst keeping optimized conductivity performance, the incorporation of hybrid nanofillers into the polymer matrix has been explored which involves the addition of GNPs [3] into CNT networks. Similar to CNTs, GNPs have the tendency to agglomerate owing to van der Waals attractive forces and inter-planar π-π stacking. GNPs with a 2-dimensional (planar) structure may also exhibit high aspect ratios which are considered as promising materials for hybrid nanofiller systems. In fact, studies on epoxy composites reinforced with GNP/CNT hybrid fillers have demonstrated the ability of GNP to help bridge adjacent nanotubes and form an interconnected conductive network with larger contact areas to enable efficient tunneling of electrons [4], thus reducing the percolation threshold of the composite. Particularly, synergistic effects on the enhanced electrical conductivity have been reported on such hybrid filler systems when using specific combination of GNPs and CNTs [3]. The mechanism of the synergistic effect was reported to be related to the formation of a 3-D hybrid structure accompanied with the improvement of overall dispersion and homogeneity with the presence of graphene [3].

However, the prior studies on the isotropic polymer composites reinforced with conductive fillers show inconsistent levels of electrical conductivity performance due to various types of fillers as well as the differences in the synthesis techniques. The electrical conductivity reported for this type of hybrid, isotropic composite system is usually orders of magnitude lower than 1 S/m. Therefore, understanding of the mechanism of conductive filler networks with respect to the types of fillers used, as well as the composite fabrication process, will be central to the progress and innovation of conductive polymer composites with low cost, light weight, and ease of processing.

There is therefore a desire to adjust the composition of polymer composites reinforced with conductive fillers—in particular GNP/CNT hybrid fillers—to obtain improved electrical conductivity.

SUMMARY OF THE INVENTION

According to a first aspect of the present invention there is provided an electrically conductive composite material comprising carbon nanotubes and graphene nanoplatelets within a polymer matrix, wherein the carbon nanotubes have an average length greater than 10 µm; and wherein the graphene nanoplatelets form in the range of 0.005 wt. % to 0.06 wt. % of the composite material. Advantageously, in the present work, such amounts of graphene, when used in conjunction with relatively long (greater than 10 µm) carbon nanotubes as the filler materials, have been found to increase the electrical conductivity of the composite material, relative to comparable composites in which no graphene nanoplatelets are present.

In certain embodiments of the composite material, the carbon nanotubes may have an average length greater than 20 µm.

In a first example the carbon nanotubes form of the order of 0.02 wt. % of the composite material; and the graphene nanoplatelets form in the range of 0.02 wt. % to 0.06 wt. % of the composite material. These amounts of carbon nanotubes and graphene nanoplatelets have been found, in the present work, to give significantly increased electrical conductivity of the composite material, relative to comparable composites in which no graphene nanoplatelets are present.

Particularly advantageously the graphene nanoplatelets may form of the order of 0.04 wt. % of the composite material, this amount of graphene nanoplatelets having been found, in the present work, to give a surprising peak in the electrical conductivity of the composite material, due to synergistic effects between the carbon nanotubes and the graphene nanoplatelets.

In a second example the carbon nanotubes form in the range of 0.2 wt. % to 0.3 wt. % of the composite material; and the graphene nanoplatelets form in the range of 0.005 wt. % to 0.04 wt. % of the composite material. These amounts of carbon nanotubes and graphene nanoplatelets have been found, in the present work, to give increased electrical conductivity of the composite material relative to comparable composites in which no graphene nanoplatelets are present.

Advantageously the graphene nanoplatelets may form of the order of 0.02 wt. % of the composite material, this amount of graphene nanoplatelets having been found, in the present work, to produce optimised electrical conductivity of the composite material due to synergistic effects between the carbon nanotubes and the graphene nanoplatelets.

Moreover, in addition to the graphene nanoplatelets forming of the order of 0.02 wt. % of the composite material, the carbon nanotubes may form of the order of 0.3 wt. % of the composite material. This combination of graphene nanoplatelets and carbon nanotubes has been found, in the present work, to produce a very high value of the electrical conductivity of the composite material, of greater than 5 S/m (to date, the highest value ever reported for an isotropic polymer composite system having a sufficiently low filler loading to enable good processability and ease of fabrication).

More generally, in certain embodiments of the composite material, the majority of carbon nanotubes have lengths in the range of 20 μm to 150 μm. In certain embodiments the majority of carbon nanotubes may have a length greater than 30 μm, or a length greater than 40 μm, or a length greater than 50 μm.

In presently-preferred embodiments the majority of graphene nanoplatelets have a diameter in the range of 0.25 μm to 1 μm, with an average diameter of the order of 0.5 μm.

In presently-preferred embodiments, the polymer matrix comprises an epoxy material, although in alternative embodiments other resins may be used instead.

Further, in presently-preferred embodiments, the composite material is isotropic.

According to a second aspect of the invention there is provided a mixture comprising carbon nanotubes and graphene nanoplatelets within a resin, wherein the carbon nanotubes have an average length greater than 10 μm; and wherein the graphene nanoplatelets form in the range of 0.005 wt. % to 0.06 wt. % of the mixture. Such a mixture may be used to form the matrix of a variety of conductive composite materials, the composite further comprising a reinforcing phase (e.g. fibres). Further exemplary details of the constitution of the mixture are as given above in relation to the first aspect of the invention.

Thus, according to a third aspect of the invention there is provided an electrically conductive composite material comprising a mixture in accordance with the second aspect of the invention, and a reinforcing phase.

According to a fourth aspect of the invention there is provided an article of manufacture comprising an electrically conductive composite material in accordance with the first or third aspects of the invention. The article may be, for example, EMI (electromagnetic interference) shielding or a lightning conductor, although many other articles may also be envisaged which exploit the electrical conductivity of the composite material, as those skilled in the art will appreciate.

According to a fifth aspect of the invention there is provided a composite production method comprising: preparing a mixture in accordance with the second aspect of the invention, and subjecting the mixture to a high shear mixing process.

For example, the high shear mixing process may be carried out at around 4500 rpm for about 20 minutes.

The method may then further comprise: adding a hardener to the resin; and subjecting the mixture to a further high shear mixing process.

For example, the further high shear mixing process may be carried out at around 4500 rpm for about 5 minutes.

The method may then further comprise subjecting the mixture to a stirring process.

For example, the stirring process may be carried out at around 500 rpm for about 5 minutes.

The method may then further comprise subjecting the mixture to a degassing process.

For example, the degassing process may be carried out at about 60° C. for about 1 hour, under negative pressure.

The method may then further comprise transferring the mixture to a mould and curing the resin, thereby producing an electrically conductive composite.

BRIEF DESCRIPTION OF THE DRAWINGS

Embodiments of the invention will now be described, by way of example only, and with reference to the drawings in which:

FIG. 5 presents transmitted optical micrographs showing the filler network morphology within cured composite samples containing (a) 0.02 wt. % CNT only; (b) 0.02 wt. % CNT+0.005 wt. % GNP; (c) 0.02 wt. % CNT+0.04 wt. % GNP; (d) 0.02 wt. % CNT+0.06 wt. % GNP;

FIG. 7 presents transmitted optical micrographs showing the filler network morphology within cured composite samples containing (a) 0.2 wt. %® CNT only; (b) 0.2 wt. % CNT+0.005 wt. % GNP; (c) 0.2 wt. % CNT+0.02 wt. % GNP; (d) 0.2 wt. % CNT+0.04 wt. % GNP;

FIG. 8 presents transmitted optical micrographs showing the filler network morphology within cured composite samples containing (a) 0.3 wt. % CNT only; (b) 0.3 wt. % CNT+0.005 wt. % GNP; (c) 0.3 wt. % CNT+0.02 wt. % GNP; (d) 0.3 wt. %© CNT+0.04 wt. % GNP;

(FIG. 9b) 0.2 wt. % CNT only; (FIG. 9c) 0.3 wt. % CNT only;

DETAILED DESCRIPTION OF PREFERRED EMBODIMENTS

Figure 2:
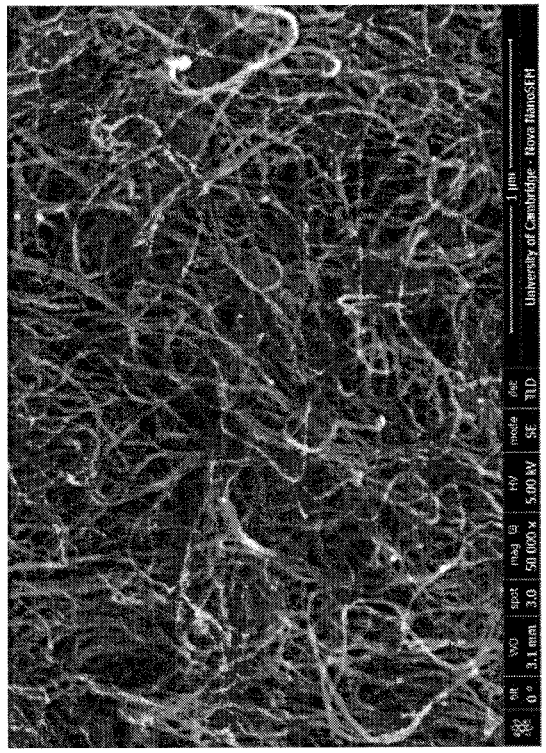
FIG. 2 is an SEM image of relatively short (~1.5 μm) Nanocyl NC7000 CNTs used in comparative tests.

The present embodiments represent the best ways known to the applicants of putting the invention into practice. However, they are not the only ways in which this can be achieved.

Overview

To improve an isotropic composite's electrical conductivity involves the careful selection of electrically conductive fillers, a controlled shear mixing process and a vacuum oven curing process, with a view to building-up effective conductive hybrid filler networks within the polymer matrix.

To this end, the present work is concerned with the fabrication of highly conductive epoxy composites using high quality CNTs and GNPs. The CNTs used were synthesized via a floating catalyst CVD method with low impurities, having an average nanotube length around 1 mm. However we are not restricted to the CVD production method or the length of nanotubes used. The GNPs used were produced using a plasma method, although we are not restricted to the plasma method only. The GNPs and/or CNTs can also be functionalized, using chemical or plasma methods.

The use of both these high-quality conductive fillers is one of the key factors in realizing good electrical performance. The conductive hybrid filler network within the epoxy resin matrix is formed by means of a controlled shear mixing process (processing parameters include RPM and shearing time at different stage), a degassing procedure at an elevated temperature, followed by a hot curing process to effectively build up the size of hybrid filler agglomerates interconnected by wide conductive paths covering throughout the matrix, resulting in improved electrical conductivity. The optimized loadings of CNTs and GNPs in the present work are based on the varied addition of GNPs into a fixed CNT loading without changing the whole composite fabrication process (i.e., the shear mixing, vacuum degassing and curing process). The addition of GNPs into the CNT network significantly improves the electrical conductivity of the composite without affecting the composite's processability (e.g., the viscosity of the filler/epoxy resin mixture prior to the curing procedure).

In a general sense, the present work provides conductive composite materials comprising CNTs and GNPs within a polymer matrix, wherein the CNTs have an average length greater than 10 µm; and wherein the GNPs form in the range of 0.005 wt. % to 0.06 wt. % of the composite material. Specific examples are discussed in greater detail below.

Function

The biggest challenge in the design of high performance isotropic polymer composites is to scale-up the properties of high-quality carbon nanomaterials from the nanoscale to the engineering scale, and this involves research methodologies based on knowledge from previous studies of conductive isotropic polymer composites, and transferring to potential industrial users.

The fabrication of highly conductive CNT/GNP epoxy composites (above 5 S/m), as achieved in the present work, is expected to provide the potential for a new generation of low-cost, lightweight isotropic polymer composites, to fulfil future demand through the development of a novel hybrid structured reinforcement for enhanced electrical performance. This has many potential areas of industrial application, from processes to applications (e.g., EMI shielding and lightning strike protection).

The present work also provides a new class of conductive resin enhanced with carbon nanomaterials, which can be incorporated as a conductive matrix in other commercialized fibre reinforced polymer composites. The hybrid CNT/GNP network using the present tailored composite fabrication process enables a higher value of electrical conductivity to be obtained, with minimal detriment to processability.

Thus, in a general sense, as well as cured (or otherwise "finished") composite materials, the present work provides conductive mixtures comprising CNTs and GNPs within a resin, wherein the CNTs have an average length greater than 10 µm; and wherein the GNPs form in the range of 0.005 wt. % to 0.06 wt. % of the mixture. Such mixtures may be used to form the matrix of a variety of conductive composite materials, the composite further comprising a reinforcing phase (e.g. fibres).

Filler Materials Used

In the present work the following filler materials were used:

CNTs

Figure 1:
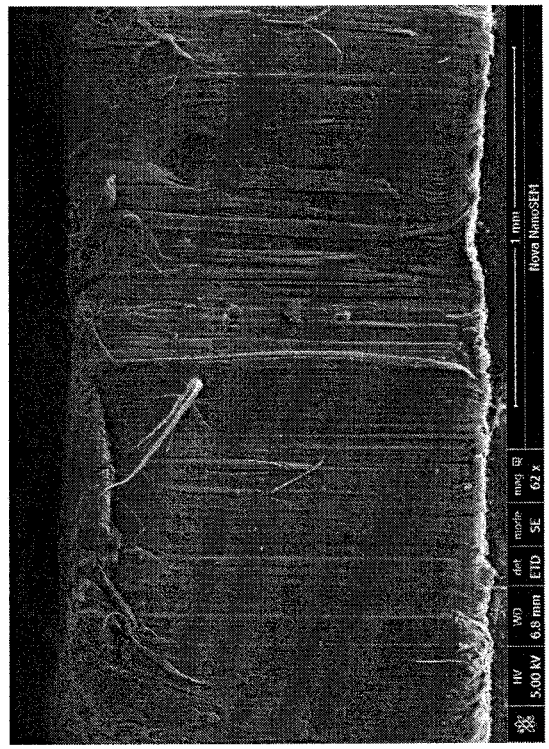
FIG. 1 is a scanning electron microscope (SEM) image of long (~1 mm) CVD-grown CNTs used in the composite materials of the present work.

Unless otherwise stated, the CNTs used were produced in accordance with research carried out at the Department of Materials Science and Metallurgy, University of Cambridge, as documented in [5]. Thus, the CNTs were produced using a chemical vapour deposition (CVD) technique with a high temperature horizontal furnace, resulting in high quality aligned CNT arrays with a length of millimeter scale, which can be used as an effective filler of high aspect ratio within the hybrid CNT/GNP polymer composite structure of the present work. These CNTs are shown in the SEM image of FIG. 1.

As discussed below (where expressly mentioned), comparative tests were also carried out using short (~1.5 µm) CNTs that are commercially available from Nanocyl s.a. under the reference NC7000. FIG. 2 presents an SEM image of Nanocyl NC7000 CNTs.

The above CVD-grown CNTs and the Nanocyl NC7000 CNTs are characterised as follows:

|  | Length | Diameter | Aspect ratio |
| --- | --- | --- | --- |
| CVD-grown CNTs | ~1 mm | 60 ± 20 nm | 10000-50000 |
| Nanocyl NC7000 | ~1.5 µm | 9.5 nm | ~150 |

GNPs

Figure 3:
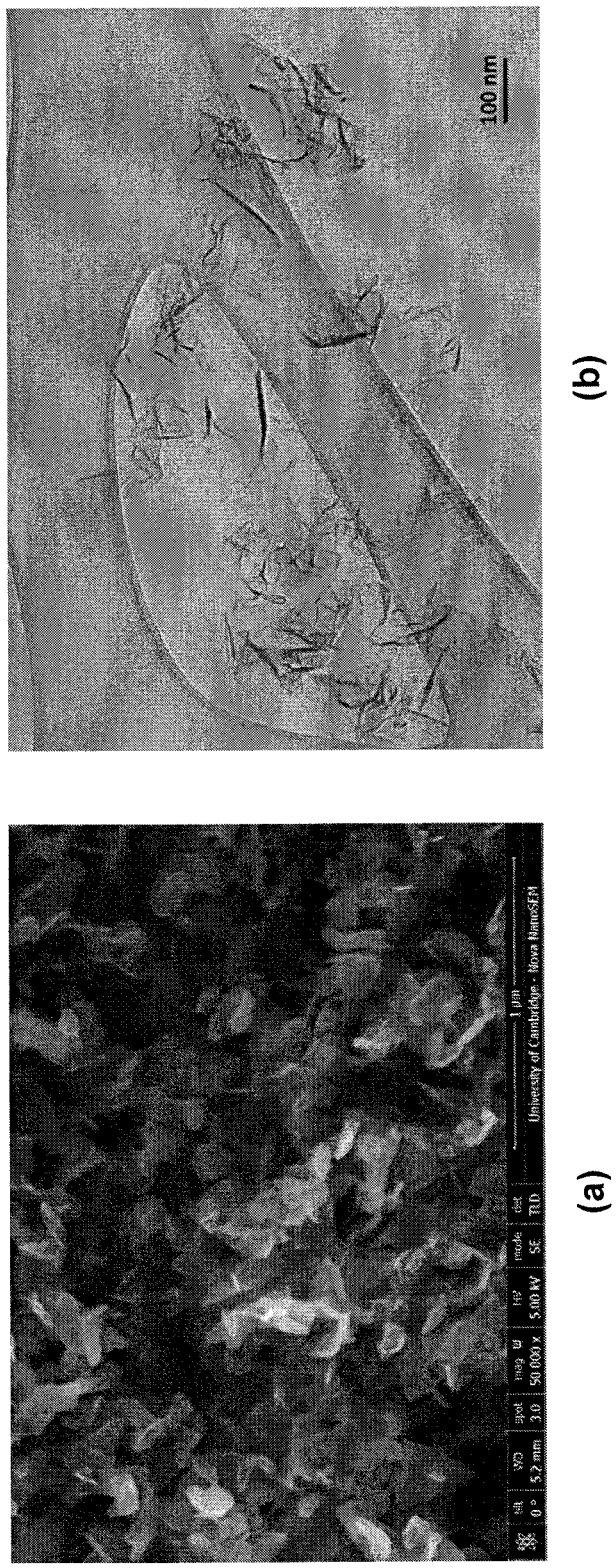
FIG. 3 presents (a) an SEM image and (b) a transmission electron microscope (TEM) image of the GNPs used in the composite materials of the present work.

The GNPs used in the present work were produced by FGV Cambridge Nanosystems Limited, and are commercially available under the brand name CamGraph®. These are large-scale GNPs with ultra-high quality, and are low in defects and impurities, and so are ideal to be used in the hybrid CNT/GNP polymer composite system of the present work. These GNPs, as used in the present work, are illustrated in FIG. 3a (SEM) and FIG. 3b (TEM), and are characterised as follows:

Thickness: <1 nm
Average Diameter: 0.5 µm (from 0.25 µm to 1 µm)
Carbon Purity: >99.5%
Catalyst Impurities: No catalyst Composite Fabrication Process The present fabrication method of isotropic hybrid CNT/GNP epoxy composites involves a controlled high shear mixing process of high quality aligned CNT arrays and GNPs.

The polymer matrix used is based on an aircraft-grade bisphenol-A epoxy resin (Araldite LY 556) and a formulated amine-based hardener (XB 3473).

The CNTs are primarily in the form of aligned arrays, which are synthesized by a floating catalyst CVD method using a solution of ferrocene (3 wt. %) in toluene as the feedstock. The solution is injected into a pre-heated nozzle (180° C.) by a Hamilton syringe (5.6 ml/h). An argon flow (1 L/min) is applied within the hot CNT growth zone (760° C.). The synthesis duration is 7 hours, giving a CNT length around 1 mm.

To begin the composite fabrication process, the fillers (CNTs and GNPs) are pre-weighed carefully with an analytical balance before being added to LY 556 epoxy resin within a glass beaker, to ensure accurate designed weight fractions of the composites. Then, the glass beaker containing pre-weighed epoxy resin, GNPs and CNTs is transferred to a high shear mechanical mixer (Silverson L4R) to carry out shear-mixing process at room temperature (20° C.). The epoxy resin and filler mixture is high sheared at 4500 rpm for 20 mins to ensure homogeneous dispersion, which is the initial stage of the shear mixing process.

In the second stage, the pre-weighed hardener XB 3473 is immediately added to the mixture at 4500 rpm for another 5 mins to allow for a homogeneous mixing of the hardener. The ratio of epoxy resin LY 556 to hardener XB 3473 is 100:23 by weight, based on the manufacturer's recommendation.

After the shear-intensive process, the third stage involves the gentle stirring of the mixture at 500 rpm for 5 mins in order to enhance the CNT/GNP agglomeration process as well as the formation of conducting networks.

Once the whole shear mixing process is done, the glass beaker containing the mixture is placed into a vacuum oven (EQ-DZF-6050-HT from MTI Corporation) to carry out a degassing process in order to remove entrapped air bubbles. The oven is pre-heated at 60° C. upon the start of the degassing process, with a view to degassing efficiently by maintaining reduced viscosity at elevated temperature. The degassing process is carried out under a pressure of −0.1 MPa for 1 hour at 60° C.

After degassing, the mixture is then slowly poured into a silicone rubber mould before increasing the temperature up to 120° C., which is the start point for the curing process. During the heating up from 60° C. to 120° C., a gentle vacuum pressure (0.06 MPa reading) is applied to further remove remaining entrapped air bubbles accompanied with further reduced level of mixture viscosity. No vacuum is applied when the temperature reaches 120° C. The standard curing process then begins: 2 h at 120° C., 2 h at 140° C. and 2 h at 180° C. Note that high curing temperatures may contribute to enhanced conductive network formation due to increased mobility of the fillers with high aspect ratios [6].

Figure 4:
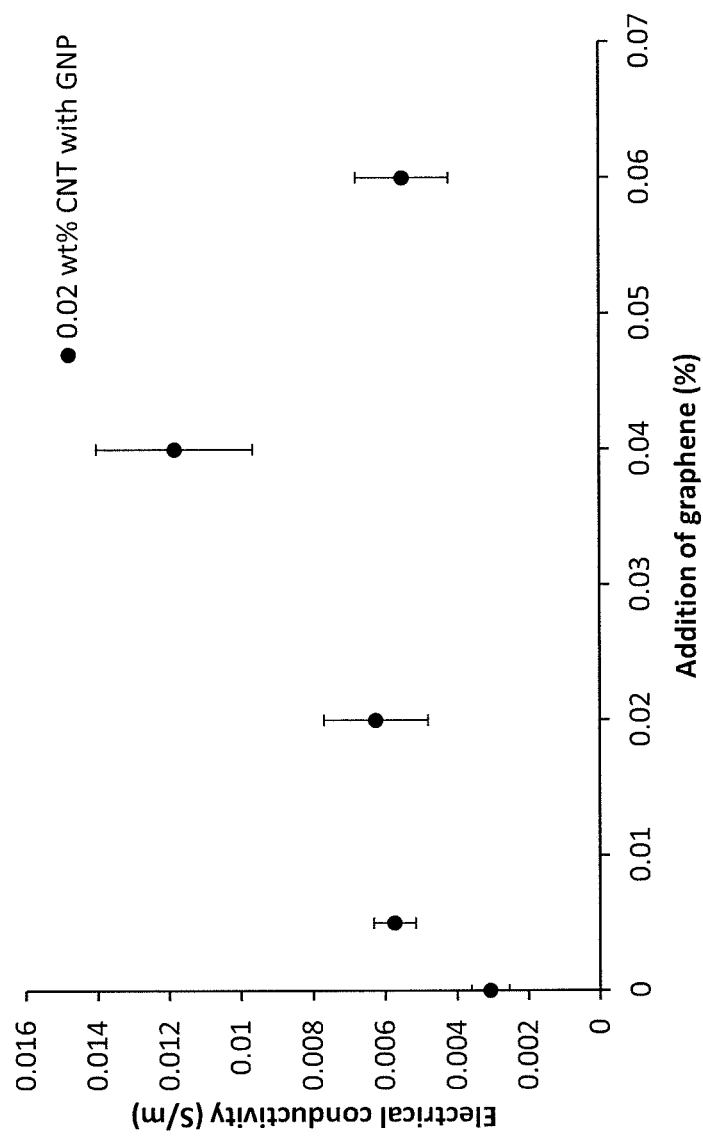
FIG. 4 is a plot showing electrical conductivity values of 0.02 wt. % CNT epoxy composites with increasing GNP loading fractions from 0 wt. % up to 0.06 wt. %.

CNT/GNP Epoxy Composites Exhibiting a Peak in Electrical Conductivity at Relatively Low CNT Levels FIG. 4 shows electrical conductivity values of 0.02 wt. % CNT epoxy composites with increasing GNP loading fractions from 0 wt. % up to 0.06 wt. %, The electrical conductivity measurements were carried out using a 2-point probe setup (Keithley 2000 Multimeter). It can be seen that the conductivity values increase with increasing GNP loading fraction up to 0.04 wt. % and decrease when the GNP loading reaches 0.06 wt. %, and this clearly demonstrates a synergistic effect.

In particular, with a fixed 0.02 wt. % CNT loading, the addition of 0.04 wt. % GNP (i.e. twice the CNT loading) was surprisingly found to give optimized performance (i.e. a pronounced peak in electrical conductivity), with the electrical conductivity having increased by around 4 times in comparison to 0.02 wt. % CNT epoxy composite without the presence of GNP (i.e., from $3.06\times10^{-3}\pm0.53\times10^{-3}$ S/m to $1.19\times10^{-2}\pm0.22\times10^{-2}$ S/m).

FIG. 5 presents transmitted optical micrographs showing the filler network morphology within cured composite samples containing (a) 0.02 wt. % CNT only; (b) 0.02 wt. % CNT+0.005 wt. % GNP; (c) 0.02 wt. % CNT+0.04 wt. % GNP; (d) 0.02 wt. % CNT+0.06 wt. % GNP. The samples were cut into thin slices with a thickness of around 0.5 mm, and further polished on two sides to obtain an ultrafine surface finish with asperities of ≤1 μm in size, resulting in a final thickness of the composite sample of about 200 μm.

In order to build up effective conductive networks with the polymer matrix, we have optimized the shear mixing process using the high temperature curing epoxy resin system to enable CNTs and GNPs to form conductive paths by means of agglomerates throughout the matrix. To investigate the morphology of conductive filler networks within cured epoxy composites containing relatively low loading fractions of GNPs and CNTs, transmitted light microscope images were taken.

FIG. 5a shows the CNT network morphology within a 0.02 wt. % CNT epoxy composite. It can be seen that a homogeneous dispersion is formed by means of CNT flocculation. Such a state of CNT dispersion can be explained by van der Waals attractive forces associated with tailored shear mixing process as well as hot temperature curing.

With the addition of 0.005 wt. % GNPs into the 0.02 wt. % CNT/epoxy mixture, the filler network morphology has been changed significantly (FIG. 5b). The hybrid filler network consists of slightly larger agglomerates throughout the matrix. Without being bound by theory, it can be speculated that a very small addition of GNPs provides additional van der Waals binding energy which enables flocculated nanotubes to be further assembled together. The CNT/GNP agglomerates are connected mainly by means of interlaced nanotube filaments. These agglomerates form a macroscopic network covering large volume fractions of the epoxy matrix, which results in improved electrical conductivity.

With the further optimized GNP loading of 0.04 wt. %, the CNT/GNP agglomerates become even larger in size, which can be seen in FIG. 5c. We may also see evidence of condensed GNP agglomeration spread over the matrix with increased addition of GNPs which can be attributed to the non-covalent π-π interactions between graphene layers (FIGS. 5c and 5d). The loading of 0.04 wt. % GNP causes self GNP agglomeration as well as interacting with CNTs of high aspect ratio, triggering the whole agglomerated network. As a result, agglomerates have been increased effectively in size, contributing to significantly better electrical conductivity.

Interestingly, further increasing the GNP addition up to 0.06 wt. % results in smaller agglomerate size with more condensed GNP agglomerations that spread over the epoxy matrix (FIG. 5d). Based on this observation, we believe the GNPs further re-assemble the filler networks by separating large agglomerates into smaller ones. In this case, smaller CNT/GNP agglomerates lead to a reduced level of CNT interconnections in-between adjacent agglomerates, which can be expected to deliver reduced electrical conductivity. The agglomerated GNPs themselves give limited contributions to the conductive network due to poor dispersion and inability to be incorporated with CNTs.

Similar synergistic effects are expected for other polymer composites having CNT loadings around 0.02 wt. %, on the addition of 0.02 wt. %-0.06 wt. % GNPs (and particularly preferably of the order of 0.04 wt. % GNPs).

CNT/GNP Epoxy Composites Exhibiting Very High Electrical Conductivity

Figure 6:
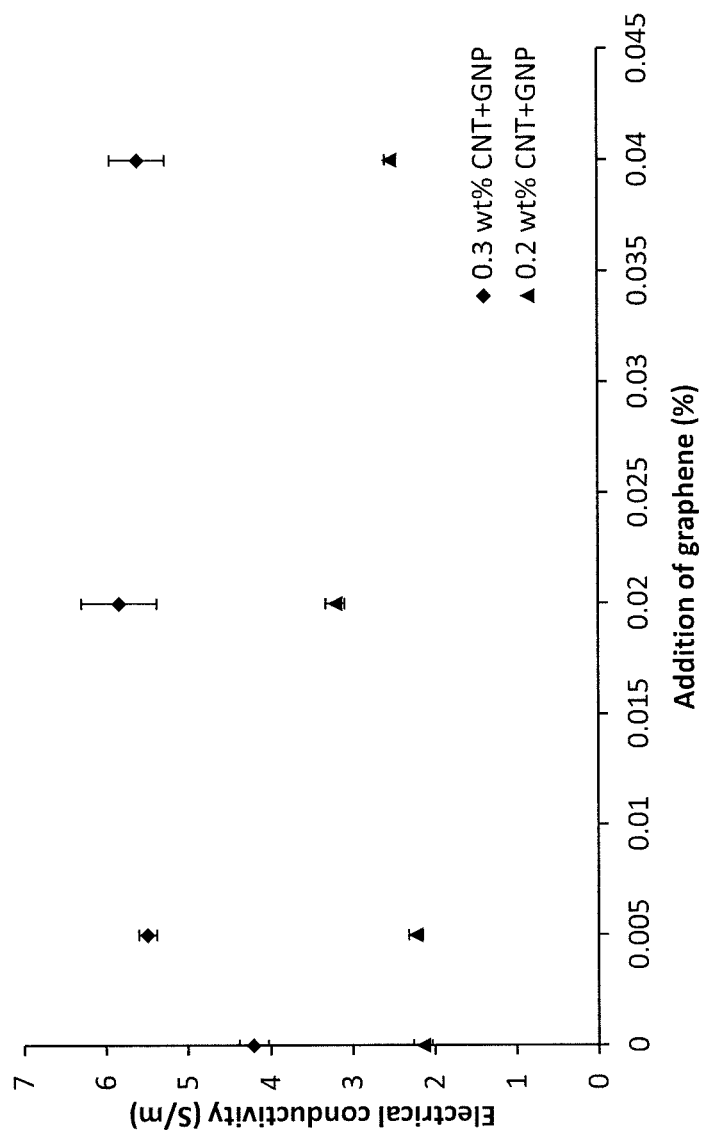
FIG. 6 is a plot showing electrical conductivity values of 0.2 wt. % and 0.3 wt. % CNT epoxy composites containing increasing GNP loading fractions from 0 wt. % to 0.04 wt. %.

FIG. 6 shows the effect of GNP addition on electrical conductivity, in respect of higher CNT loading fractions of 0.2 wt. % and 0.3 wt. %. The electrical conductivity measurements were carried out using a 2-point probe setup (Keithley 2000 Multimeter). We still see a clear synergistic effect on 0.2 wt. % CNT epoxy composites with varied GNP loadings, where the addition of 0.02 wt. % GNP gives a peak in electrical conductivity. However, the optimized GNP loading at 0.2 wt. % CNT gives around 1.5 times better performance than pure 0.2 wt. % CNT epoxy composite (i.e., from 2.15±0.11 S/m to 3.21±0.23 S/m), which indicates a less effective synergistic effect compared to the above case of 0.02 wt. % CNT loading.

In the case of 0.3 wt. % CNT loading, the addition of 0.02 wt. % GNP gives around 1.4 times better electrical conductivity than pure 0.3 wt. % CNT epoxy composite—albeit without a clear synergistic effect (from 4.21±0.18 S/m to 5.84±0.46 S/m), as increasing the GNP loading from 0.02 wt. % to 0.04 wt. % results in few improvements. Nevertheless, and very importantly, this optimized conductivity value, above 5 S/m, is the highest ever reported for an isotropic polymer composite system having a sufficiently low filler loading to enable good processability and ease of fabrication.

FIG. 7 presents transmitted optical micrographs showing the filler network morphology within cured composite samples containing (a) 0.2 wt. % CNT only; (b) 0.2 wt. % CNT+0.005 wt. % GNP; (c) 0.2 wt. % CNT+0.02 wt. % GNP; (d) 0.2 wt. % CNT+0.04 wt. % GNP. The samples were cut into thin slices with a thickness of around 0.5 mm, and further polished on two sides to obtain an ultrafine surface finish with asperities of ≤1 μm in size, resulting in a final thickness of the composite sample of about 200 μm.

The conductive filler network morphology of 0.2 wt. % CNT epoxy composites with varied GNP loadings was examined by transmitted light microscope under low magnification. As shown in FIG. 7a, a homogeneous dispersion can be observed for pure 0.2 wt. % CNT epoxy composite consisting of small interconnected CNT agglomerates, and this can be attributed to the application of external low shear forces during the shear mixing process which favours the agglomeration process.

The addition of 0.005 wt. % GNPs enables the small agglomerates to migrate and form larger agglomerates (FIG. 7b). Although some spaces can be visually seen within the matrix when compared to that of pure 0.2 wt. % CNT epoxy composite; the larger agglomerates interconnect with each other and effectively build up conductive paths which compensate for the loss of conductive filler coverage throughout the matrix.

The incorporation of 0.02 wt. % GNPs has been found to be the optimized loading for the 0.2 wt. % CNT/epoxy system (FIG. 7c). The agglomerates are further assembled into bigger ones, resulting in wider conductive paths, which improve the electrical conductivity by 40% compared to the filler network shown in FIG. 7a.

From FIG. 7d, increasing the GNP addition up to 0.04 wt. % helps further migrate the agglomerates, revealing a large resin-rich area. Such a resin-rich area indicates loss of conductive paths even though the agglomerates remain large in size.

The mechanism of the conductive network morphology for 0.3 wt. % CNT epoxy composites with varied GNP loadings is believed to be the same as that of 0.2 wt. % CNT epoxy composites with varied GNP loadings, as indicated by the same trend exhibited by the two data series in FIG. 6.

FIG. 8 presents transmitted optical micrographs showing the filler network morphology within cured composite samples containing (a) 0.3 wt. % CNT only; (b) 0.3 wt. % CNT+0.005 wt. % GNP; (c) 0.3 wt. % CNT+0.02 wt. % GNP; (d) 0.3 wt. % CNT+0.04 wt. % GNP. The samples were cut into thin slices with a thickness of around 0.5 mm, and further polished on two sides to obtain an ultrafine surface finish with asperities of ≤1 μm in size, resulting in a final thickness of the composite sample of about 200 μm.

It can be seen that the addition of GNPs condenses and enlarges the agglomerates which results in improved electrical conductivity. In FIG. 8d, the agglomerates are further condensed, however, leaving more empty spaces that separate adjacent agglomerates, hence the performance does not improve significantly, as shown in the plot of FIG. 6.

Length Distribution of CNTs

Figure 9A:
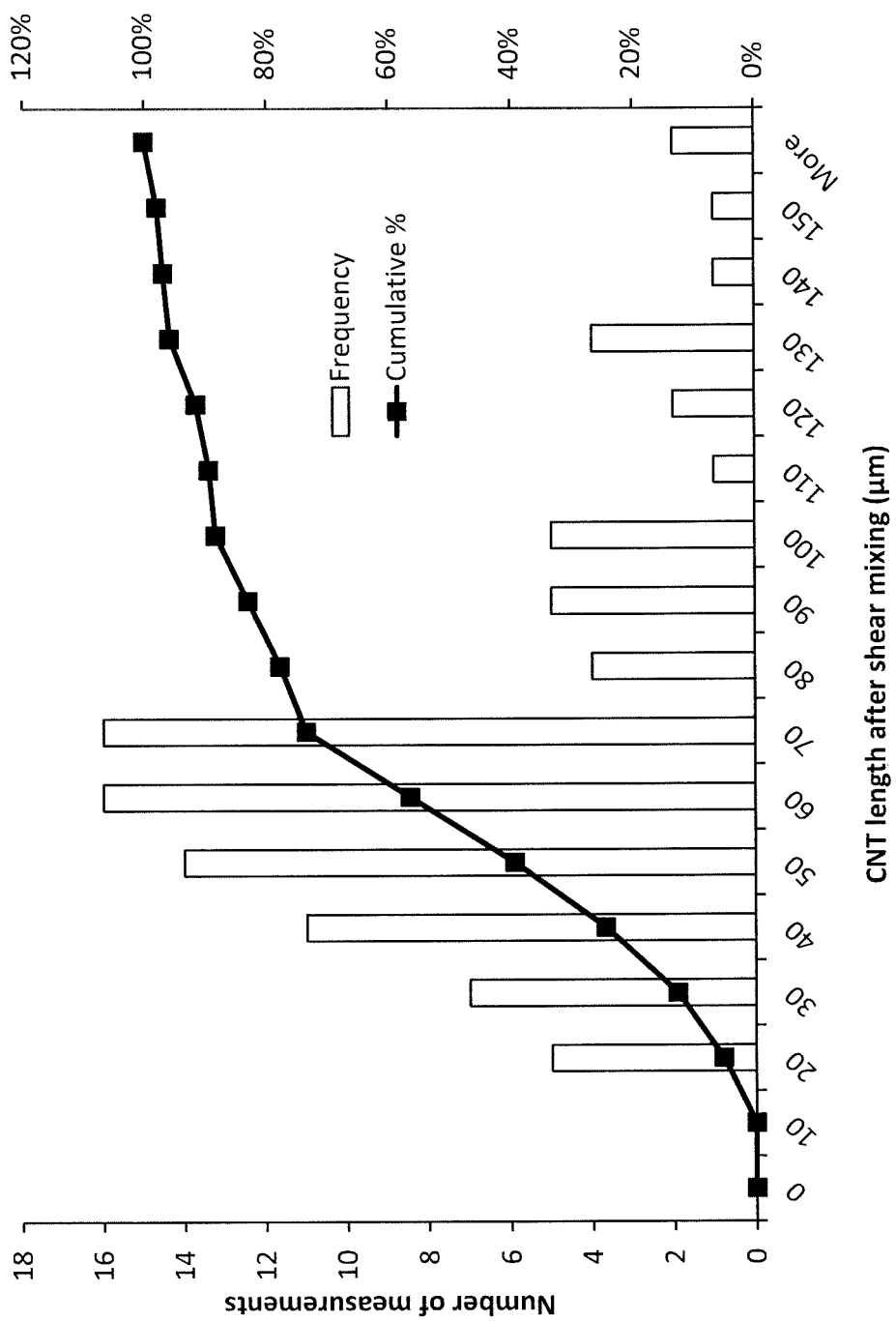
FIGS. 9a, 9b and 9c show length distributions of CNTs after the shear mixing process, in respect of epoxy composites containing (FIG. 9a) 0.02 wt. % CNT only.
Figure 9B:
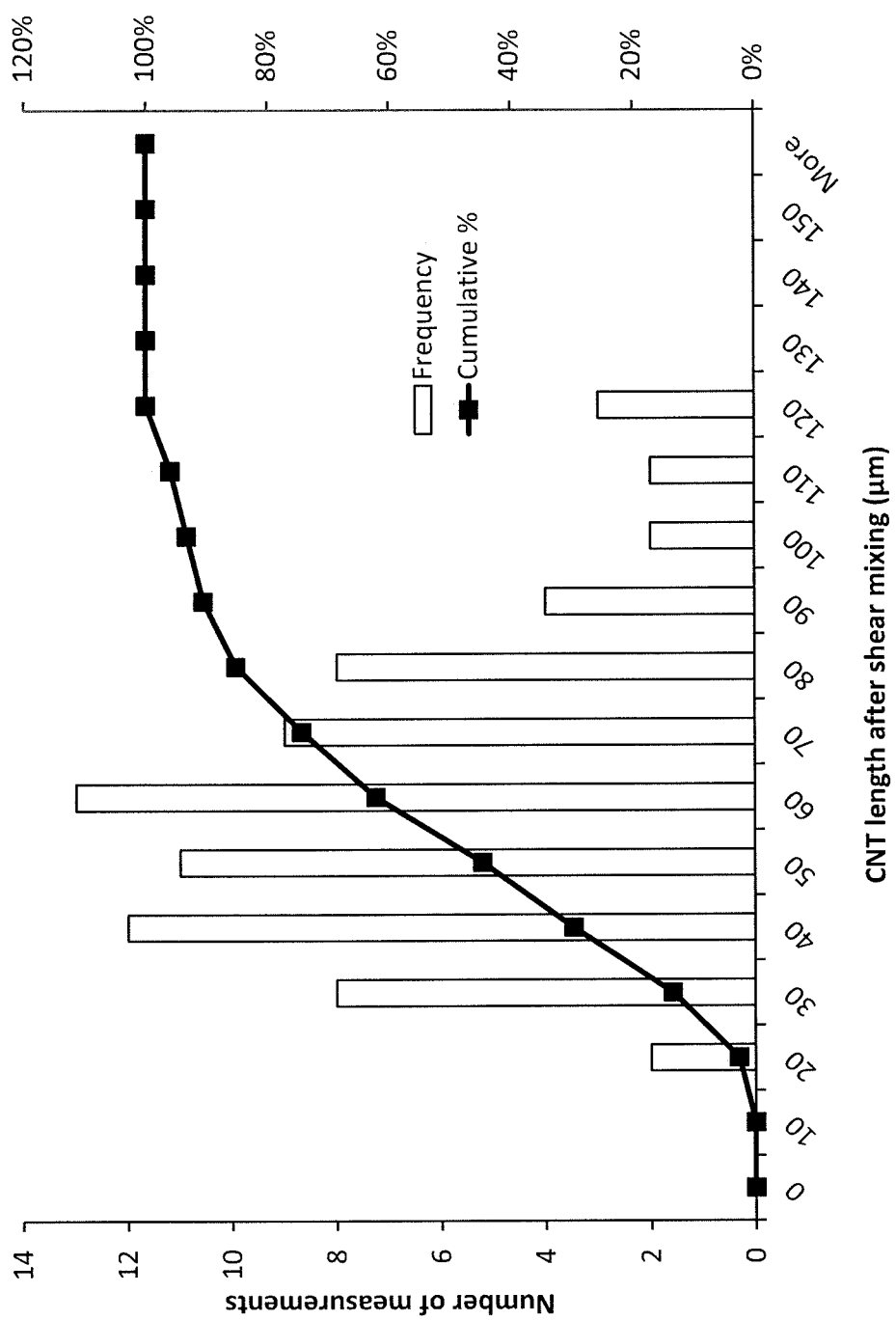
Figure 9C:
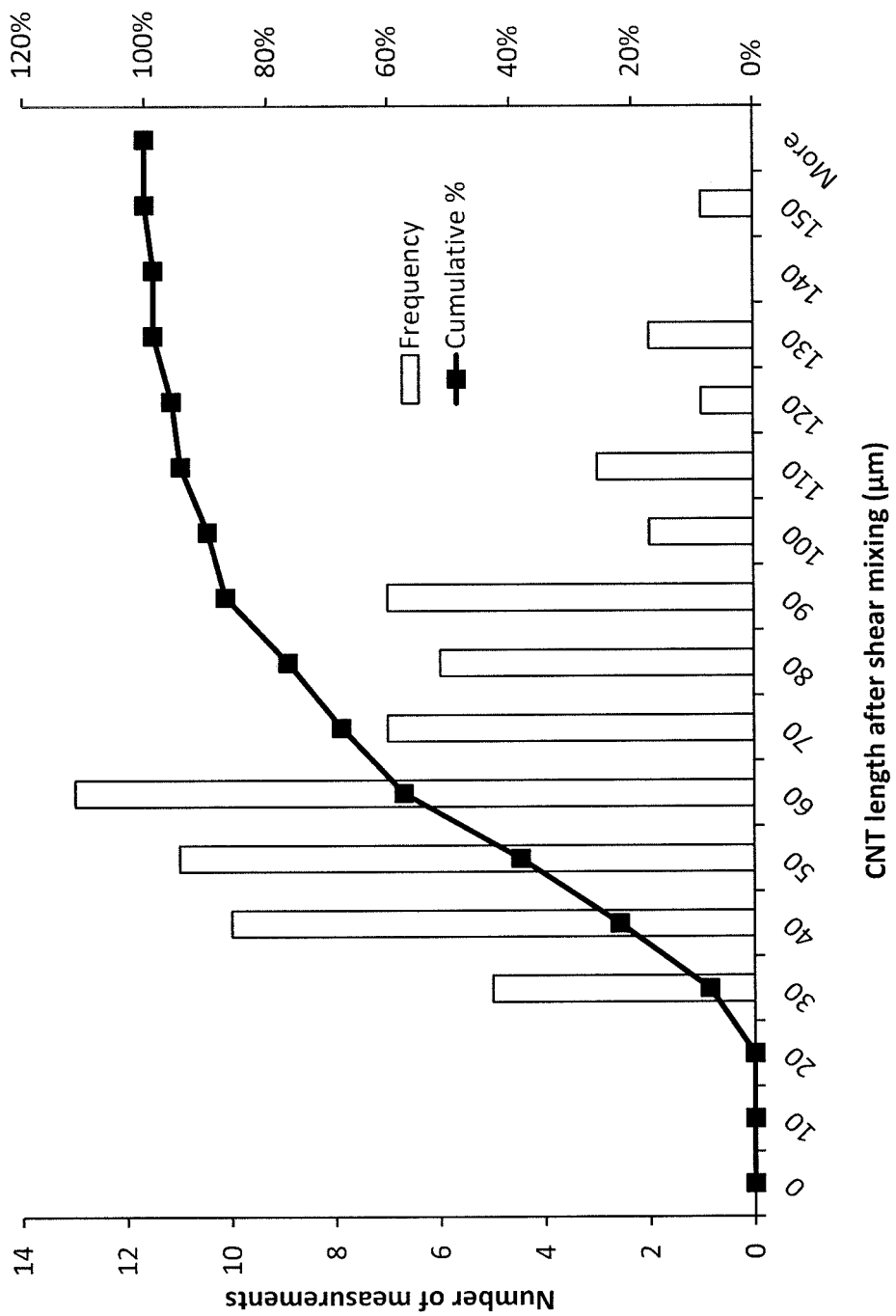

FIGS. 9a, 9b and 9c show length distributions of CNTs after the shear mixing process of epoxy composites containing (FIG. 9a) 0.02 wt. % CNT only; (FIG. 9b) 0.2 wt. % CNT only; (FIG. 9c) 0.3 wt. % CNT only.

From these results it can be seen that the CNTs (which are originally of the order of 1 mm in length) exhibit reduced length after the shear mixing process. However, no significant difference in the average CNT length is observed for varied CNT loading fractions within the epoxy composites.

It will be appreciated from these results that the majority of CNTs, once processed, have lengths in the range of 20 μm to 150 μm. For example, the majority of CNTs may have a length greater than 30 μm, or a length greater than 40 μm, or a length greater than 50 μm.

The relatively long length of the CNTs used in the present work (the CNTs being significantly longer, by at least an order of magnitude, than the relatively short (~1 μm) CNTs used for example in [3]) contributes to the increased electrical conductivity values achieved by the CNT/GNP polymer composites of the present work.

Indeed, broadly similar results, in terms of enhanced electrical conductivity values, would be expected for CNT/GNP polymer composites having CNTs of an average length of the order of 10 μm or above (since 10 μm is of the same order of magnitude as the lower end of the 20-150 μm range mentioned above), for similar CNT and GNP loading fractions to those discussed above.

Comparative Tests Using Shorter CNTs (Nanocyl NC7000 CNTs)

For comparative tests, CNT epoxy composites, without GNPs and with a range of GNP weight fractions, were made using relatively short (~1.5 μm) Nanocyl NC7000 CNTs instead of the relatively long (~1 mm) CVD-grown CNTs used above.

Figure 10:
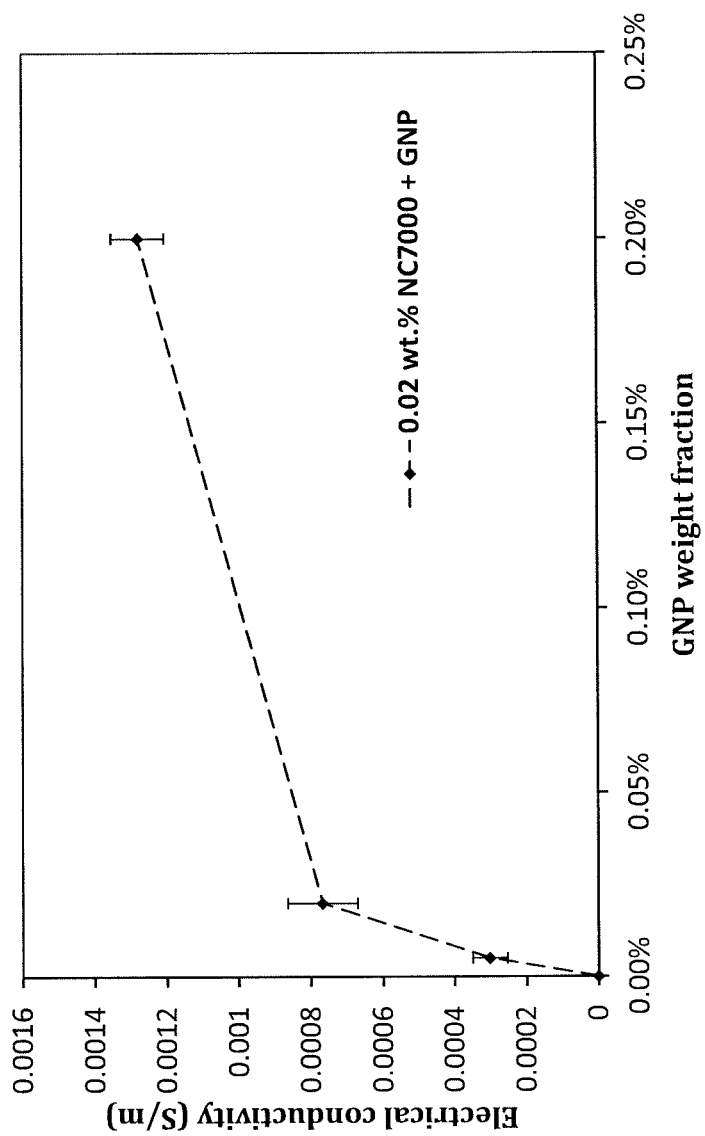
FIG. 10 is a plot showing, as comparative tests, electrical conductivity values of 0.02 wt. % CNT epoxy composites containing increasing GNP loading fractions from 0 wt. % up to 0.2 wt. %, produced using the relatively short (~1.5 μm) Nanocyl NC7000 CNTs.

FIG. 10 is a plot showing electrical conductivity values of 0.02% CNT epoxy composites with increasing GNP weight fractions from 0 wt. % up to 0.2 wt. %, produced using the Nanocyl NC7000 CNTs.

Figure 11:
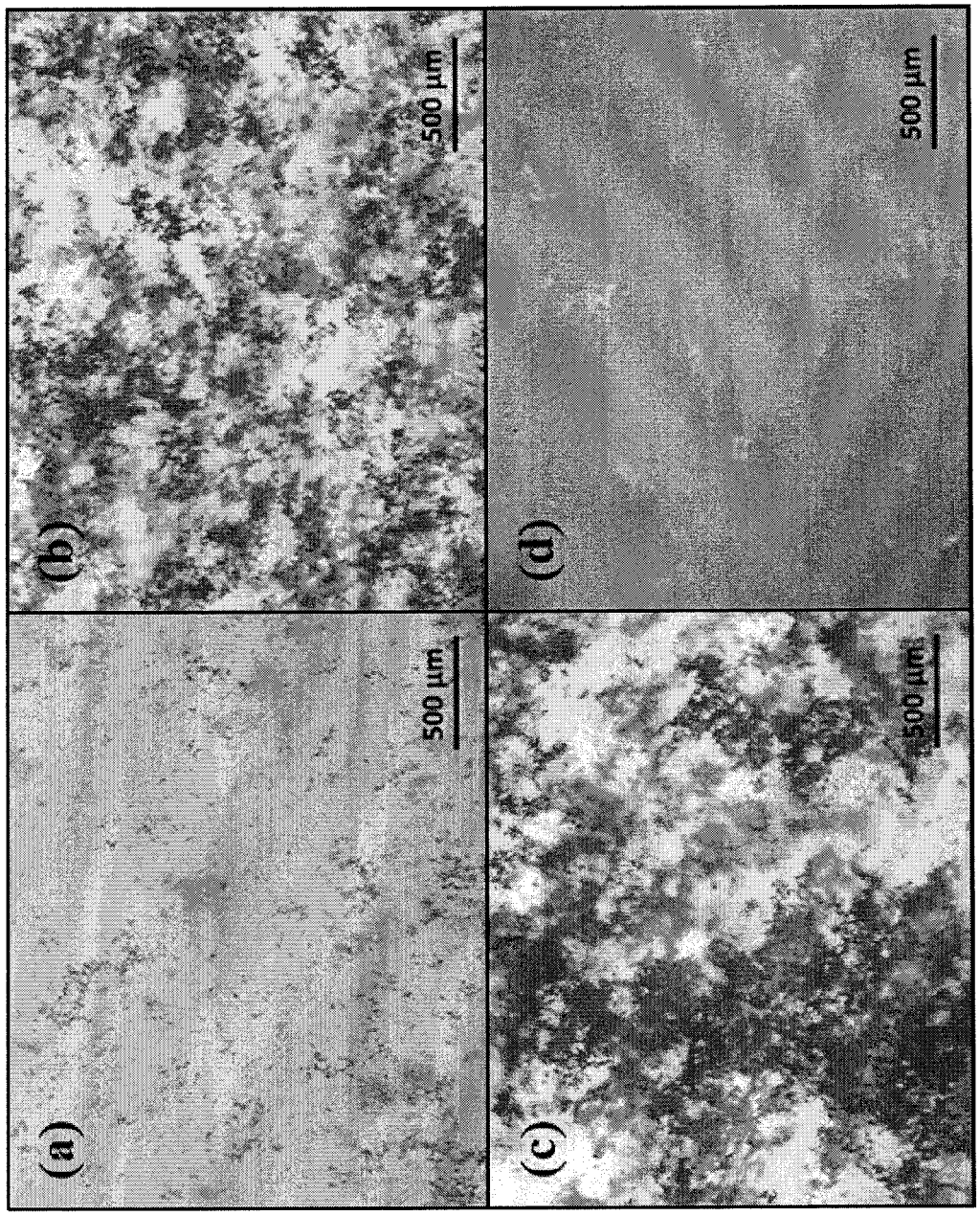
FIG. 11 presents transmitted optical micrographs of the composites used in the comparative tests of FIG. 10, having GNP weight fractions of (a) 0 wt. %, (b) 0.005 wt. % (c) 0.02 wt. % and (d) 0.2 wt. %.

FIG. 11 presents transmitted optical micrographs of the composites used in the comparative tests of FIG. 10, having GNP weight fractions of (a) 0 wt. %, (b) 0.005 wt. % (c) 0.02 wt. % and (d) 0.2 wt. %.

From FIGS. 10 and 11 it can be seen that no synergistic effects were obtained with 0.02 wt. % NC7000 CNT/GNP epoxy composites. The addition of GNPs as low as 0.005 wt. % triggers percolating network of the composite (FIG. 11(b)), by assembling GNPs and GNTs into small, interconnected agglomerates. The agglomerates will grow further and assemble into larger ones until GNPs start to dominate throughout the matrix.

Figure 12:
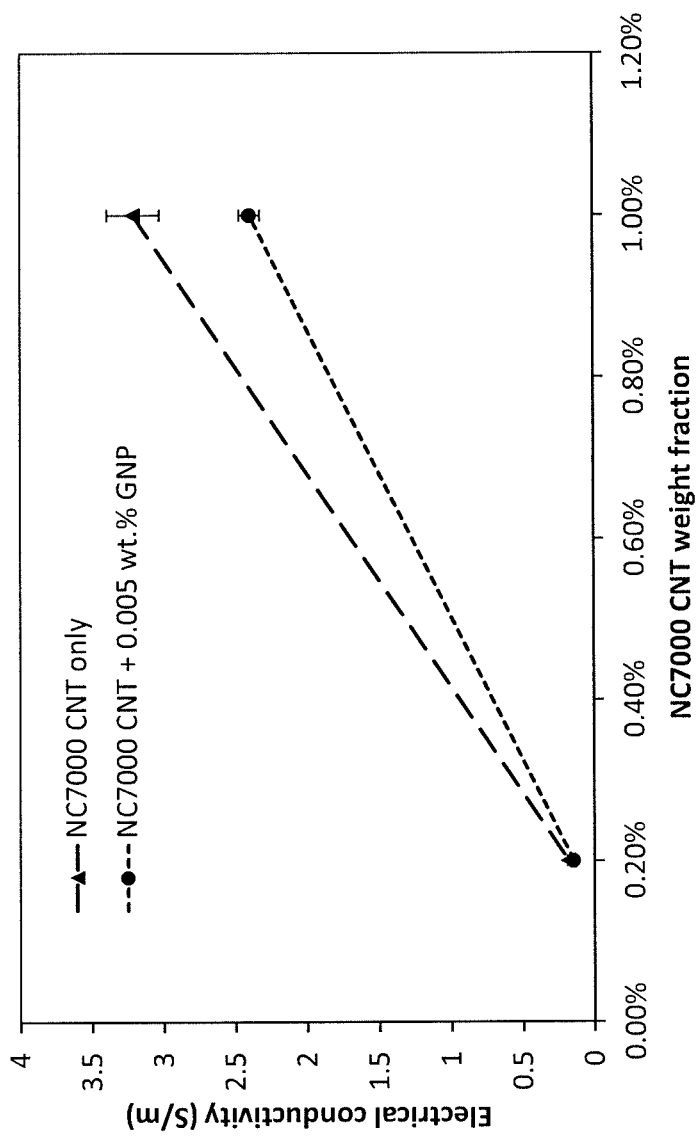
FIG. 12 is a plot showing, as comparative tests, electrical conductivity values of 0.2 wt. % and 1 wt. % CNT epoxy composites produced using the relatively short (~1.5 μm) Nanocyl NC7000 CNTs, in the absence of GNPs and with the addition of 0.005 wt. % GNPs.

FIG. 12 is a plot showing electrical conductivity values of 0.2 wt. % and 1 wt. % CNT epoxy composites, produced using the Nanocyl NC7000 CNTs, in the absence of GNPs and with the addition of 0.005 wt. % GNPs.

Figure 13:
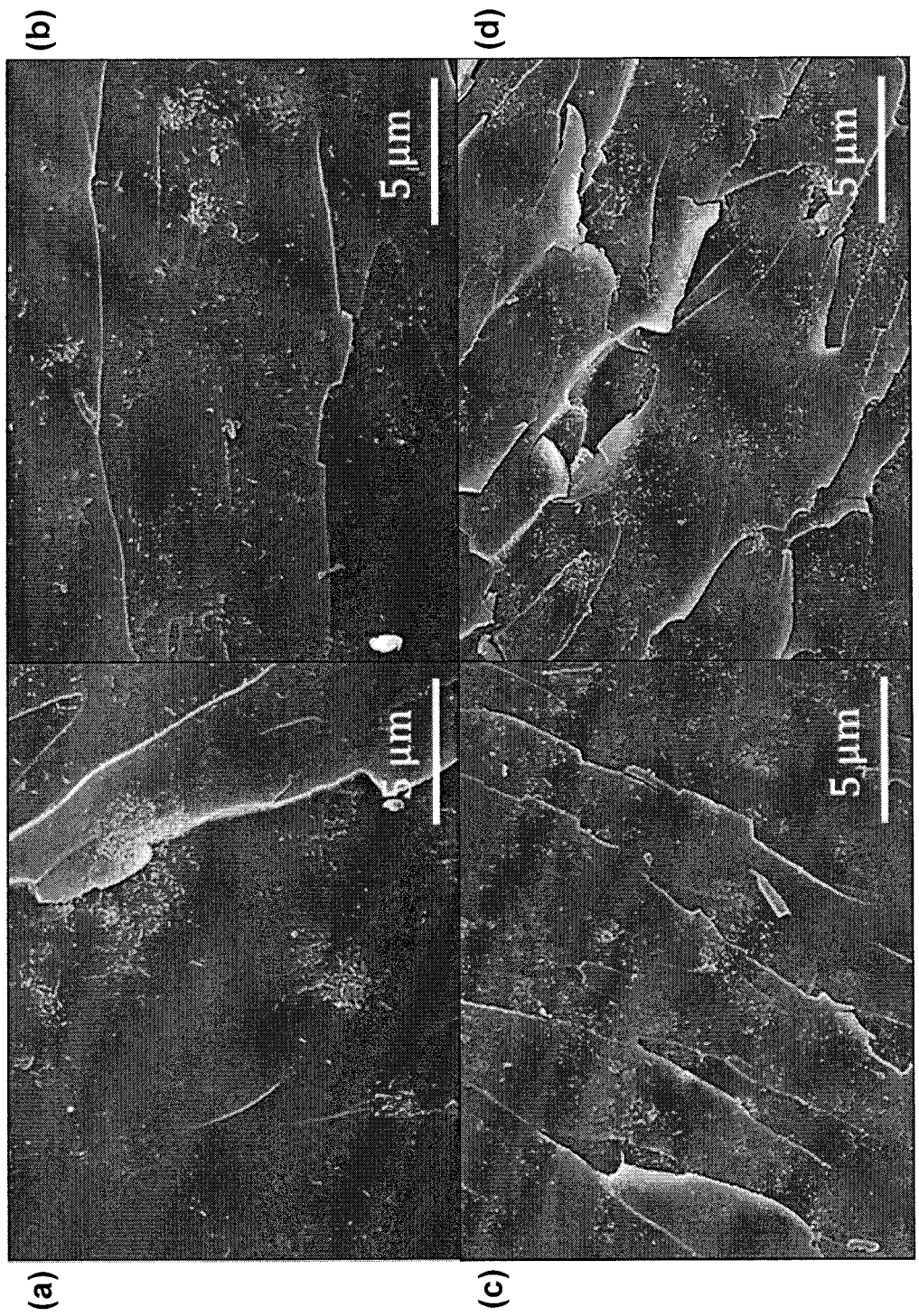
FIG. 13 presents transmitted optical micrographs of the composites used in the comparative tests of FIG. 12, namely (a) 0.2 wt. % NC7000 CNT with no GNPs; (b) 0.2 wt. % NC7000 CNT+0.005 wt. % GNP; (c) 1 wt. % NC7000 CNT with no GNPs; and (d) 1 wt. % NC7000 CNT+0.005 wt. % GNP.

FIG. 13 presents transmitted optical micrographs of the composites used in the comparative tests of FIG. 12, namely (a) 0.2 wt. % NC7000 CNT with no GNPs; (b) 0.2 wt. % NC7000 CNT+0.005 wt. % GNP; (c) 1 wt. % NC7000 CNT with no GNPs; and (d) 1 wt. % NC7000 CNT+0.005 wt. % GNP.

From FIGS. 12 and 13 it can be seen that the addition of 0.005 wt. % GNPs into both 0.02 wt. % and 1 wt. % NC7000 CNTs results in reduced electrical conductivity. In the absence of GNPs the NC7000 CNTs are highly entangled (FIGS. 13(a) and (c)) forming agglomerates; however they become more dispersed (FIGS. 13(b) and (d)) upon the addition of GNPs.

SUMMARY

For relatively low CNT loading (0.02 wt. %), the addition of 0.04 wt. % GNP (i.e., twice the CNT loading) gives optimized electrical conductivity of the epoxy composite, with the electrical conductivity increasing by around 4 times compared to 0.02 wt. % CNT epoxy composite without the presence of GNP.

For higher CNT loading of 0.3 wt. %, the addition of ~0.02 wt. % GNP enables a highly conductive (above 5 S/m) hybrid CNT/GNP epoxy composite to be fabricated a using controlled shear mixing method with ease of processing. Broadly similar, although lower, electrical conductivity results were obtained using a CNT loading of 0.2 wt. %.

The selection of high-quality conductive fillers (e.g. CNTs with long length and high aspect ratio) is one of the key factors in delivering good electrical performance.

The mechanism of conductive network morphology has been successfully examined by transmitted optical microscopy and SEM. We have seen that a highly conductive filler network usually involves the formation of interconnected agglomerates rather than homogeneous dispersion of the filler.

Without being bound by theory, it is believed that the presence of GNPs helps bridge long CNTs, modify the size of agglomerates and possibly the migration of agglomerates by means of non-covalent interactions. However for short CNTs (e.g. ~1.5 μm NC7000 CNTs), a dramatic increase in the number of contacts would be required for an enhanced conductive network.

The synergistic behaviours and their effects on the electrical conductivities depend on the processing methods during composite fabrication, filler loading fractions, and the geometric shapes and dimensions of the conductive fillers used.

Modifications and Alternatives

Detailed embodiments and some possible alternatives have been described above. As those skilled in the art will appreciate, a number of modifications and further alternatives can be made to the above embodiments whilst still benefiting from the inventions embodied therein.

For instance, although, in the composites discussed above, the polymer matrix is made of an epoxy material, in alternative embodiments the matrix may comprise an alternative polymer material.

Moreover, CNTs and GNPs produced by different routes from those discussed above may be used.

Finally, with regard to the composite production method, whilst certain processing parameters (temperatures, time periods, pressures, etc.) are given above, it will be appreciated that these are by way of example only, and in alternative embodiments different processing parameters may be used—particularly if the materials used to form the composite are different from those discussed above.

REFERENCES

[1] M. Gagné and D. Therriault. Lightning strike protection of composites. Progress in Aerospace Sciences. 2014; 64:1-16.

[2] Length-dependent electrical and thermal properties of carbon nanotube-loaded epoxy nanocomposites. Michael Russ, Sameer S. Rahatekar, Krzysztof Koziol, Benjamin Farmer, Hua-Xin Peng. Composites Science and Technology. Volume 81, 14 Jun. 2013, Pages 42-47.

[3] Liang Yue, Gholamreza Pircheraghi, Seyed Ali Monemian, Ica Manas-Zloczower. Epoxy composites with carbon nanotubes and graphene nanoplatelets—Dispersion and synergy effects. Carbon Volume 78, November 2014, Pages 268-278.

[4] Sandip Maiti, Nilesh K. Shrivastava, Supratim Suin, and B. B. Khatua, Polystyrene/MWCNT/Graphite Nanoplate Nanocomposites: Efficient Electromagnetic Interference Shielding Material through Graphite Nanoplate-MW-CNT-Graphite Nanoplate Networking. ACS Appl. Mater. Interfaces 2013, 5,4712-4724.

[5] C Singh, M S P Shaffer, A H Windle. Production of controlled architectures of aligned carbon nanotubes by an injection chemical vapour deposition method. Carbon 2003; 41(2):359-68.

[6] C. A. Martin, J. K. W. Sandler, M. S. P. Shaffer, M. K. Schwarz, W. Bauhofer, K. Schulte, et al. Formation of percolating networks in multi-wall carbon-nanotube-epoxy composites. Compos Sci Technol, 64 (15) (2004), pp. 2309-2316.

The invention claimed is:

1. An electrically conductive composite material, comprising:
   carbon nanotubes and graphene nanoplatelets within a polymer matrix; wherein the polymer matrix is an epoxy matrix;
   wherein a majority of the carbon nanotubes have lengths in the range of 20 μm to 150 μm;
   wherein the carbon nanotubes form of the order of 0.02 wt. % of the composite material; and
   wherein the graphene nanoplatelets form in the range of 0.02.wt % to 0.06 wt. % of the composite material.

2. The electrically conductive composite material according to claim 1, wherein the graphene nanoplatelets form of the order of 0.04 wt. % of the composite material.

3. The electrically conductive composite material according to claim 1, wherein the majority of carbon nanotubes have a length greater than 30 μm.

4. The electrically conductive composite material according to claim 3, wherein the majority of carbon nanotubes have a length greater than 40 μm.

5. The electrically conductive composite material according to claim 4, wherein the majority of carbon nanotubes have a length greater than 50 μm.

6. The electrically conductive composite material according to claim 1, wherein the majority of graphene nanoplatelets have a diameter in the range of 0.25 μm to 1 μm.

7. The electrically conductive composite material according to claim 6, wherein the graphene nanoplatelets have an average diameter of the order of 0.5 μm.

8. The electrically conductive composite material according to claim 1, being isotropic.

9. The electrically conductive composite material according to claim 1, comprised in an article.

10. An electrically-conductive composite material, comprising:
carbon nanotubes and graphene nanoplatelets within a polymer matrix; wherein the polymer matrix is an epoxy matrix;
wherein a majority of the carbon nanotubes have lengths in the range of 20 μm to 150 μm;
wherein the carbon nanotubes form in the range of 0.2 wt. % to 0.3 wt. % of the composite material; and
wherein the graphene nanoplatelets form in the range of 0.005 wt. % to 0.04 wt. % of the composite material.

11. The electrically conductive composite material according to claim 10, wherein the graphene nanoplatelets form of the order of 0.02 wt. % of the composite material.

12. The electrically conductive composite material according to claim 11, wherein the carbon nanotubes form of the order of 0.3 wt. % of the composite material.

13. The electrically conductive composite material according to claim 10, comprised in an article.

14. A composite production method, comprising:
preparing, by a high shear mixing process, a mixture comprising carbon nanotubes and graphene nanoplatelets within a resin; wherein the resin is an epoxy resin;
wherein a majority of the carbon nanotubes have lengths in the range of 20 μm to 150 μm;
wherein the carbon nanotubes form of the order of 0.02 wt. % of the composite material; and
wherein the graphene nanoplatelets form in the range of 0.02 wt. % to 0.06 wt. % of the mixture.

15. The method according to claim 14, wherein the high shear mixing process is carried out at around 4500 rpm for about 20 minutes.

16. The method according to claim 14, further comprising:
adding a hardener to the resin;
subjecting the mixture to a further high shear mixing process that is carried out at around 4500 rpm for about 5 minutes; and
subjecting the mixture to a stirring process that is carried out at around 500 rpm for about 5 minutes.

17. The method according to claim 14, further comprising subjecting the mixture to a degassing process that is carried out at about 60° C. for about 1 hour, under negative pressure.

18. The method according to claim 14, further comprising transferring the mixture to a mold and curing the resin.

* * * * *